(12) United States Patent
Hudman et al.

(10) Patent No.: US 10,764,558 B2
(45) Date of Patent: Sep. 1, 2020

(54) REDUCED BANDWIDTH STEREO DISTORTION CORRECTION FOR FISHEYE LENSES OF HEAD-MOUNTED DISPLAYS

(71) Applicant: Valve Corporation, Bellevue, WA (US)

(72) Inventors: Joshua Mark Hudman, Issaquah, WA (US); Kameron Wade Rausch, Sammamish, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/144,805

(22) Filed: Sep. 27, 2018

(65) Prior Publication Data

US 2020/0107013 A1   Apr. 2, 2020

(51) Int. Cl.
*H04N 13/239* (2018.01)
*H04N 13/344* (2018.01)
*G02B 13/06* (2006.01)

(52) U.S. Cl.
CPC ......... *H04N 13/239* (2018.05); *H04N 13/344* (2018.05); *G02B 13/06* (2013.01); *H04N 2213/001* (2013.01)

(58) Field of Classification Search
CPC ... H04N 13/194; H04N 13/344; G02B 27/017
See application file for complete search history.

(56) References Cited

U.S. PATENT DOCUMENTS

| | | | | |
|---|---|---|---|---|
| 9,288,468 | B2* | 3/2016 | Vaught | H04N 13/383 |
| 10,212,428 | B2* | 2/2019 | Trepte | G06T 7/70 |
| 10,488,678 | B1* | 11/2019 | Lemoff | G02C 7/04 |
| 2010/0079356 | A1* | 4/2010 | Hoellwarth | G02B 27/017 345/8 |
| 2012/0154557 | A1* | 6/2012 | Perez | H04N 21/25891 348/53 |
| 2013/0002813 | A1* | 1/2013 | Vaught | H04N 13/383 348/43 |
| 2015/0370150 | A1* | 12/2015 | O'Neill | G03B 17/565 348/360 |
| 2018/0005034 | A1* | 1/2018 | Kaehler | G06T 7/73 |
| 2018/0045910 | A1* | 2/2018 | O'Neill | G02B 7/14 |

* cited by examiner

*Primary Examiner* — Paulos M Nathnael
(74) *Attorney, Agent, or Firm* — Seed Intellectual Property Law Group LLP

(57) ABSTRACT

Systems and methods of providing stereo depth cameras for head-mounted display systems that require less memory and/or processing power. The stereo depth camera may include a left camera and a right camera spaced apart from each other by a distance. Each of the left and right cameras may be skewed outward by a non-zero angle from a forward direction of the head-mounted display system to provide a relatively wide field of view for the stereo depth camera. Each of the left and right cameras may include a camera sensor array and a camera lens positioned forward of the camera sensor array. Each of the camera lenses may include an optical axis that is laterally offset from the center of the associated camera sensor array toward a center of the support structure to center the left camera lens substantially on a scene center or principal point.

16 Claims, 8 Drawing Sheets

REDUCED BANDWIDTH STEREO DISTORTION CORRECTION FOR FISHEYE LENSES OF HEAD-MOUNTED DISPLAYS

BACKGROUND

Technical Field

The present disclosure generally relates to depth cameras for head-mounted display systems.

Description of the Related Art

One current generation of virtual reality ("VR") experiences is created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCos), or OLED technologies, for example. A binocular HMD has the potential to display a different image to each eye. This capability is used to display stereoscopic images.

Demand for displays with heightened performance has increased with the development of smart phones, high-definition televisions, as well as other electronic devices. The growing popularity of virtual reality and augmented reality systems, particularly those using HMDs, has further increased such demand. Virtual reality systems typically envelop a wearer's eyes completely and substitute a "virtual" reality for the actual or physical view (or actual reality) in front of the wearer, while augmented reality systems typically provide a semi-transparent or transparent overlay of one or more screens in front of a wearer's eyes such that actual view is augmented with additional information, and mediated reality systems may similarly present information to a viewer that combines real-world elements with virtual elements. In many virtual reality and augmented reality systems, the movement of a wearer of such a head-mounted display may be tracked in various manners, such as via sensors in the head-mounted display and/or external to it, in order to enable the images being shown to reflect user movements.

Positional tracking allows an HMD to estimate its position relative to the environment around it, using a combination of hardware and software to detect absolute position. Positional tracking is an important feature in virtual reality, making it possible to track movement with six degrees of freedom (6DOF). Position tracking facilitates various benefits to the virtual reality experience. For example, position tracking may change the viewpoint of a user to reflect different actions such as ducking, leaning forward, or jumping, and may allow for a representation of the user hands or other objects in the virtual environment. Position tracking also improves the 3D perception of the virtual environment because of parallax (i.e., the way objects closer to the eyes move faster than objects farther away).

There are different methods of positional tracking, including acoustic tracking, inertial tracking, magnetic tracking, optical tracking, etc., and/or combinations thereof. Inside-out tracking is a type positional tracking that may be used to track the position of HMDs and/or related objects (e.g., controllers). Inside-out tracking differs from outside-in tracking by the location of the cameras or other sensors used to determine the HMD's position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment.

The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

BRIEF SUMMARY

A head-mounted display system may be summarized as including a support structure; and a stereo depth camera carried by the support structure, the stereo depth camera operative to capture stereo images, the stereo depth camera including a left camera skewed outward by a non-zero angle from a forward direction of the head-mounted display system, the left camera comprising a left camera sensor array and a left camera lens positioned forward of the left camera sensor array, the left camera lens comprising an optical axis that is laterally offset from the center of the left camera sensor array toward a center of the support structure to center the left camera lens substantially on a principal point; and a right camera horizontally spaced apart from the left camera and skewed outward by a non-zero angle from the forward direction of the head-mounted display system, the right camera comprising a right camera sensor array and a right camera lens positioned forward of the right camera sensor array, the right camera lens comprising an optical axis that is laterally offset from the center of the right camera sensor array toward the center of the support structure to center the right camera lens substantially on the principal point.

Each of the left camera lens and the right camera lens may include a fisheye lens. The optical axis of the left camera lens may be laterally offset from the center of the left camera sensor array by a left offset distance and the optical axis of the right camera lens may be laterally offset from the center of the right camera sensor array by a right offset distance, wherein the left offset distance may be equal to the right offset distance. The left camera and right camera may each be skewed outward by a non-zero angle that is between 5 degrees and 10 degrees from the forward direction. The respective lateral offsets of the left and right camera lenses may provide a horizontal disparity between corresponding points of images captured by the left and right cameras that is less than 5 pixels. The left and right camera lenses may be laterally offset such that the distortion of the camera lenses is centered about a scene center that is in the forward direction of the head-mounted display system.

A stereo depth camera operative to capture stereo images may be summarized as including a left camera skewed outward by a non-zero angle from a forward direction of a head-mounted display system, the left camera comprising a left camera sensor array and a left camera lens positioned forward of the left camera sensor array, the left camera lens comprising an optical axis that is laterally offset from the center of the left camera sensor array toward a center of the head-mounted display system to center the left camera lens substantially on a principal point; and a right camera horizontally spaced apart from the left camera and skewed outward by a non-zero angle from the forward direction of the head-mounted display system, the right camera comprising a right camera sensor array and a right camera lens positioned forward of the right camera sensor array, the right camera lens comprising an optical axis that is laterally offset from the center of the right camera sensor array toward the center of the head-mounted display system to center the right camera lens substantially on the principal point.

Each of the left camera lens and the right camera lens may include a fisheye lens. The optical axis of the left camera lens may be laterally offset from the center of the left camera sensor array by a left offset distance and the optical axis of the right camera lens may be laterally offset from the center of the right camera sensor array by a right offset distance, wherein the left offset distance may be equal to the right offset distance. The left camera and right camera may each be skewed outward by a non-zero angle that is between 5 degrees and 10 degrees from the forward direction. The respective lateral offsets of the left and right camera lenses may provide a horizontal disparity between corresponding points of images captured by the left and right cameras that is less than 5 pixels. The left and right camera lenses may be laterally offset such that the distortion of the camera lenses is centered about a scene center that is in the forward direction of the head-mounted display system.

A method of providing a stereo depth camera operative to capture stereo images may be summarized as including coupling a left camera to a support structure of a head-mounted display system, the left camera skewed outward by a non-zero angle from a forward direction of the head-mounted display system, wherein the left camera comprises a left camera sensor array and a left camera lens positioned forward of the left camera sensor array, the left camera lens comprising an optical axis that is laterally offset from the center of the left camera sensor array toward a center of the support structure to center the left camera lens substantially on a principal point; and coupling a right camera to the support structure of the head-mounted display system, the right camera skewed outward by a non-zero angle from the forward direction of the head-mounted display system, the right camera comprises a right camera sensor array and a right camera lens positioned forward of the right camera sensor array, the right camera lens comprising an optical axis that is laterally offset from the center of the right camera sensor array toward the center of the support structure to center the right camera lens substantially on the principal point.

Coupling a left and right camera to a support structure of a head-mounted display system may include coupling a left and right camera to a support structure of a head mounted display system, and each of the left camera lens and the right camera lens may include a fisheye lens. Coupling a left and right camera to a support structure of a head-mounted display system may include coupling a left and right camera to a support structure of a head mounted display system, and the optical axis of the left camera lens may be laterally offset from the center of the left camera sensor array by a left offset distance and the optical axis of the right camera lens is laterally offset from the center of the right camera sensor array by a right offset distance, wherein the left offset distance may be equal to the right offset distance. Coupling a left and right camera to a support structure of a head-mounted display system may include coupling a left and right camera to a support structure of a head mounted display system, and the left camera and right camera may each be skewed outward by a non-zero angle that is between 5 degrees and 10 degrees from the forward direction.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
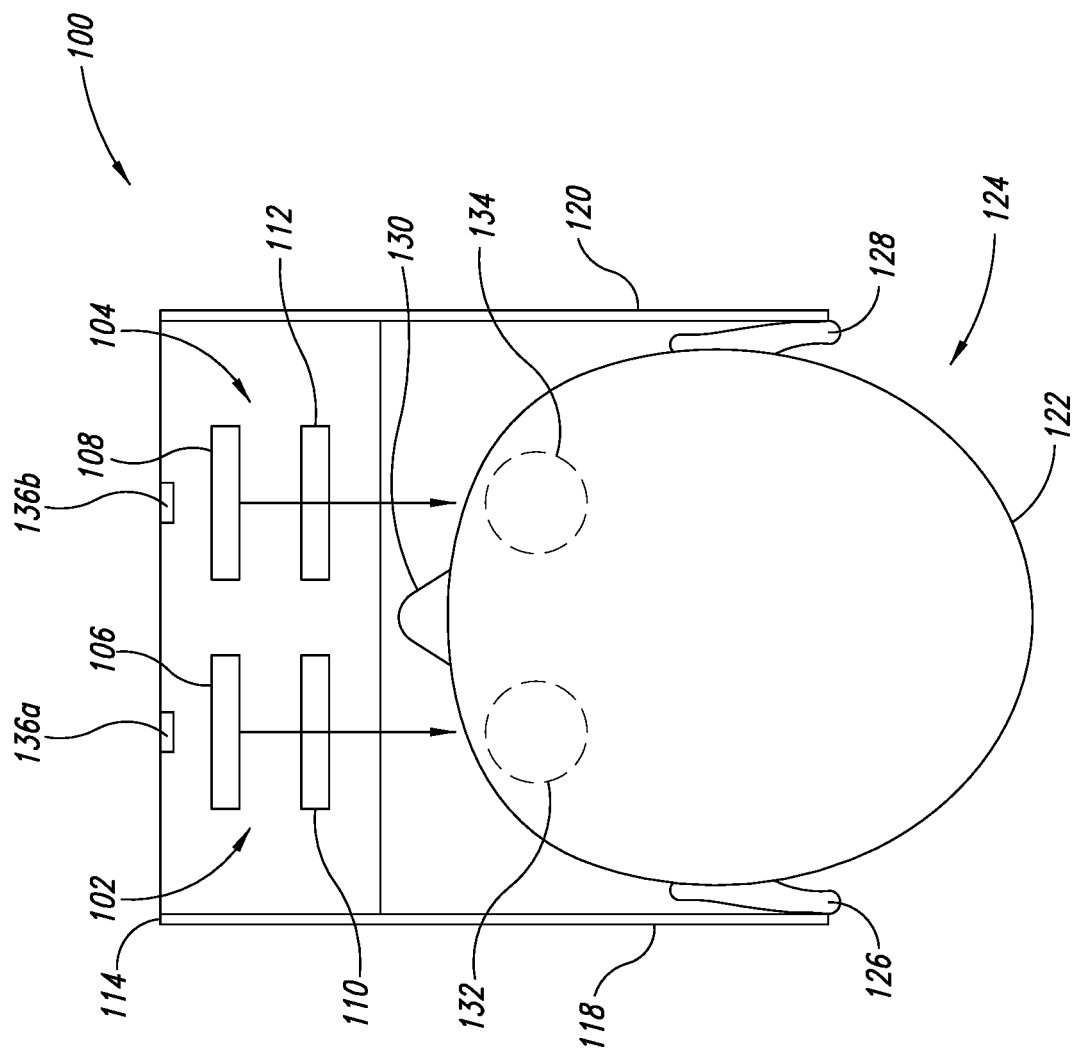
FIG. 1 illustrates a top plan view of a head-mounted display system which includes binocular display, in particular manners in particular embodiments in accordance with the described techniques of the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Systems and methods of the present disclosure are directed to providing stereo depth cameras to implement inside-out tracking for head-mounted display systems that require reduced memory and/or processing requirements. In at least some implementations, a stereo depth camera is carried by a support structure of a head-mounted display system. The stereo depth camera may include a left side camera and a right side camera, also referred to herein as left and right cameras or first and second cameras. The left and right cameras are spaced apart from each other by a distance (e.g., 60-65 mm). In at least some implementations, each of the left and right cameras may be skewed horizontally outward by a non-zero angle (e.g., 5-10 degrees) from a forward direction of the head-mounted display system to provide a relatively wide overall field of view (FOV) for the stereo depth camera. As discussed further below, the left camera may include a left camera sensor array and a left camera lens (or lens assembly), such as a fisheye lens, positioned forward of the left camera sensor array. The left camera lens may include an optical axis that is laterally offset from the center of the left camera sensor array toward a center of the support structure to center the left camera lens substantially on a scene center or principal point. Similarly, the right camera may include a right camera sensor array and a right camera lens, such as a fisheye lens, positioned forward of the right camera sensor array. The right camera lens may include an optical axis that is laterally offset from the center of the right camera sensor array toward the center of the support structure to center the right camera lens substantially on the scene center or principal point. As discussed further below, these features align the pixels of images captured by the left and right sensor arrays, which reduces or eliminates the need perform pixel shifts in memory, and allows for reduced memory requirements and/or allows available memory to be used for other purposes (e.g., distortion correction).

Generally, a depth sensing stereoscopic camera or "stereo depth camera" includes two sensors or cameras positioned a baseline distance (e.g., about eye distance) apart from each other that are capable of sensing object depth in a field of view. This may be accomplished via stereo triangulation or reconstruction, where depth data of pixels are determined from data acquired using a stereo or multiple-camera setup system. This way, it is possible to determine the depth to points in the scene, for example, from the center point of the line between their focal points. In order to solve the depth measurement problem using a stereo camera system, it is necessary to first find corresponding points in the different images. Solving the correspondence problem is one of the main problems when using this type of technique. For instance, various types of noise, such as geometric noise from lens distortion or interest point detection error, lead to inaccuracies in the measured image coordinates.

As an example, the disparity of features between two stereo images may be computed as a shift to the left of an image feature in a left image when viewed in a right image. For instance, a single point (or other feature) that appears at the x coordinate t (measured in pixels) in a left image obtained by a left camera may be present at the x coordinate t−30 in a right image obtained by a right camera. In this case, the horizontal disparity at that location in the right image would be 30 pixels. The aligning of images from multiple cameras may undesirably require significant memory or other resources (e.g., processing, data transmission), which may be limited in various applications, such as real-time applications and/or applications where it is desirable to minimize weight, size, or cost.

Further, for lenses having relatively high distortion at large fields of view, such as fisheye lenses, large disparity of features between two stereo images may inhibit the identification of corresponding features. For example, since the lenses used may have a lot of distortion at large fields of view, a processor (e.g., image signal processor) may have a difficult time finding correlation between the left and right images because the distortion changes the shape of the feature(s) that the system is looking for as a function of field of view. Thus, if the user is looking at an area that is in the center of the FOV of one camera (e.g., left camera), where there is low distortion, in the center a feature has little or no distortion. If the same feature is positioned at the edge or periphery of the FOV of the other camera (e.g., right camera), the same feature has significant distortion. In such cases, the system may not determine that the points are matching due to the varying distortion of the feature in the two images.

Thus, there is a limitation on how much distortion can be allowed for in the two cameras of a stereo depth camera. That limit may be driven by available memory. For example, if there is a particular amount of memory available for the image signal processor, a small section of an image can be undistorted or corrected. For instance, an image signal processor may allow for only about 10 percent distortion, but a camera may have 33-34 percent distortion at the periphery. As a result, without utilizing the implementations discussed herein, depth may only be calculated over central portions of an image (e.g., portions that are less than 10 percent distortion in this example).

In at least some implementations of the present disclosure, rather than shifting pixels in memory to align the images of the two cameras, for each camera the lens is offset from the center of the sensor so that the optical or alignment axis of the lens is not aligned to center of the sensor, but rather it is aligned to some offset value, which corresponds to the amount that the lens would be offset due to the outward tilt of the camera. Accordingly, the pixels in images of the left and right cameras are at least substantially aligned with each other without having to do the shift in memory. By offsetting the lens to be centered on the scene center rather than the sensor center, the system does not need to offset the images by a number of pixels (e.g., 30 pixels) in memory to align the two cameras on the scene. Various features of the present disclosure are discussed further below with reference to the Figures.

FIG. 1 is a simplified top plan view of an HMD system 100 that includes a pair of near-to-eye display systems 102 and 104. The near-to-eye display systems 102 and 104 include displays 106 and 108, respectively (e.g., OLED micro-displays), and respective optical lens systems 110 and 112 that each have one or more optical lenses. The display systems 102 and 104 may be mounted to a support structure or frame 114 or other mounting structure which includes a front portion 116, a left temple 118 and right temple 120. The two display systems 102 and 104 may be secured to the frame 114 in an eye glasses arrangement which can be worn on the head 122 of a user 124. The left temple 118 and right temple 120 may rest over the user's ears 126 and 128, respectively, while a nose assembly (not shown) may rest over the user's nose 130. The frame 114 may be shaped and sized to position each of the two optical systems 110 and 112 in front of one of the user's eyes 132 and 134, respectively. Although the frame 114 is shown in a simplified manner similar to eyeglasses for explanatory purposes, it should be appreciated that in practice more sophisticated structures (e.g., goggles, integrated headband, helmet, straps, etc.) may be used to support and position the displays systems 102 and 104 on the head 122 of user 124.

The HMD system 100 of FIG. 1 is capable of presenting a virtual reality display to the user 124, such as via corresponding video presented at a display rate such as 30 frames (or images) per second or 90 frames per second, while other embodiments of a similar system may present an augmented reality display to the user 124. Each of the displays 106 and 108 may generate light which is transmitted through and focused by the respective optical systems 110 and 112 onto the eyes 132 and 134, respectively, of the user 124. While not illustrated here, each of the eyes includes a pupil aperture through which light passes into the eye, with a typical pupil size ranging from 2 mm (millimeters) in diameter in very bright conditions to as much as 8 mm in dark conditions, while the larger iris in which the pupil is contained may have a size of approximately 12 mm—the pupil (and enclosing iris) may typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 124 as images and/or video. In some implementations, the distance between each of the optical systems 110 and 112 and the user's eyes 132 and 134 may be relatively short (e.g., less than 30 mm, less than 20 mm), which advantageously causes the HMD system 100 to appear lighter to the user since the weight of the optical systems and the display systems are relatively close to the user's face, and also may provide the user with a greater field of view.

The HMD system 100 may also include forward cameras 136a and 136b which may be cameras of a stereo depth camera 136. The stereo depth camera 136 may be operative to capture image data that may be selectively presented to the user 124, for example, in augmented reality applications or in conjunction with virtual reality applications. Additionally or alternatively, the stereo depth camera 136 may be used by a position tracking system of the HMD system 100 to track the position of the HMD system 100 during use, as discussed elsewhere herein. As an example, each of the cameras 136a and 136b may comprise a video camera and associated lens system that captures images at a frame rate (e.g., 30 Hz, 60 Hz, 90 Hz) in a front camera field of view that has a relatively wide angle (e.g., 60°, 90°, 120°, 150°).

While not illustrated in FIG. 1, some embodiments of such an HMD system may include various additional internal and/or external sensors, such as to perform pupil tracking separately for each eye 132 and 134, to track head location and orientation (e.g., as part of head tracking), to track various other types of movements and position of the user's body, other cameras to record external images (e.g., of an environment), etc.

Further, while the described techniques may be used in some embodiments with a display system similar to that illustrated in FIG. 1, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

Figure 2:
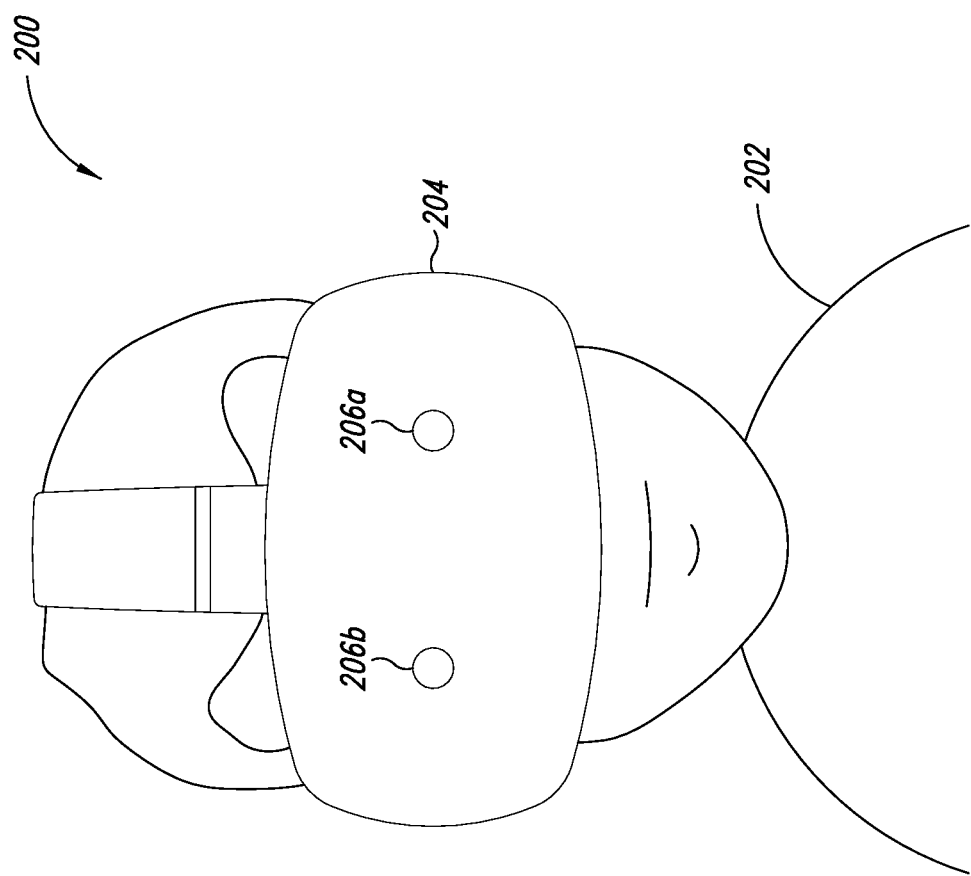
FIG. 2 is a front pictorial diagram of a head-mounted display system which includes binocular display subsystems and forward cameras that are components of a stereo depth camera, in particular manners in particular embodiments in accordance with the described techniques of the present disclosure.
Figure 3:
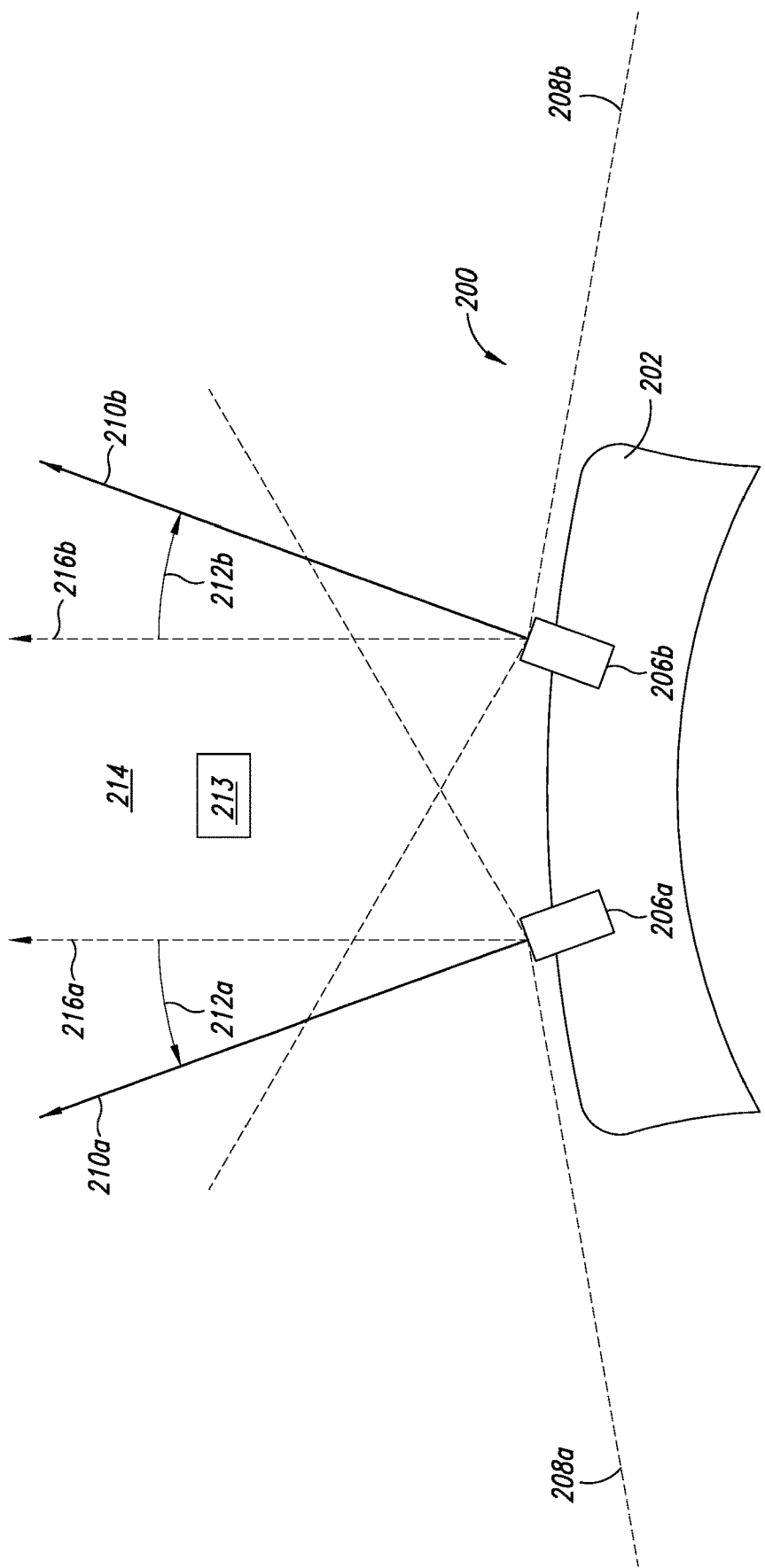
FIG. 3 is a top plan view of the head-mounted display system shown in FIG. 2, showing particular features of the cameras of the stereo depth camera, in particular manners in particular embodiments in accordance with the described techniques of the present disclosure.

FIG. 2 shows a front view of an example HMD system 200 when worn on the head of a user 202. FIG. 3 shows a top plan view of the HMD system 200, showing example fields of view 208a and 208b for forward cameras 206a and 206b, respectively, of the HMD system 200. The HMD system 200 includes a support structure 204 that supports the front facing or forward stereo depth cameras 206a and 206b. The camera 206a may be referred to herein as the left camera 206a and the camera 206b may be referred to herein as the right camera 206b. The stereo depth cameras 206a and 206b may be similar or identical to the cameras 136a and 136b discussed above with reference to FIG. 1.

As shown in FIG. 3, the cameras 206a and 206b are directed forward toward a scene or environment 214 in which the user 202 operates the HMD system 200. The environment 214 may include one or more objects 213 (one shown) therein, which may include walls, ceilings, furniture, stairs, cars, trees, tracking markers, or any other types of objects.

The cameras 206a and 206b may have respective fields of view 208a and 208b. As a non-limiting example, the fields of view 208a and 208b may be relatively large angle (e.g., 60°, 90°, 120°, 150°). As indicated by the arrow 210a, the left camera 206a may be skewed or tilted horizontally outward by a non-zero angle 212a from a forward direction (indicated by arrow 216a) of the head-mounted display system 200. Similarly, as indicated by the arrow 210b, the right camera 206b may be skewed or tilted horizontally outward by a non-zero angle 212b from a forward direction (indicated by arrow 216b) of the head-mounted display system 200. For example, the non-zero angles 212a and 212b may be between 5 and 10 degrees (e.g., 5 degrees, 7, degrees, 10 degrees). The two cameras 206a and 206b each have different pointing angles ("toed-out") to capture images over a relatively large field of view (e.g., 150° to 180°), compared to implementations where the cameras are pointed directly forward or inward ("toed-in").

Figure 4:
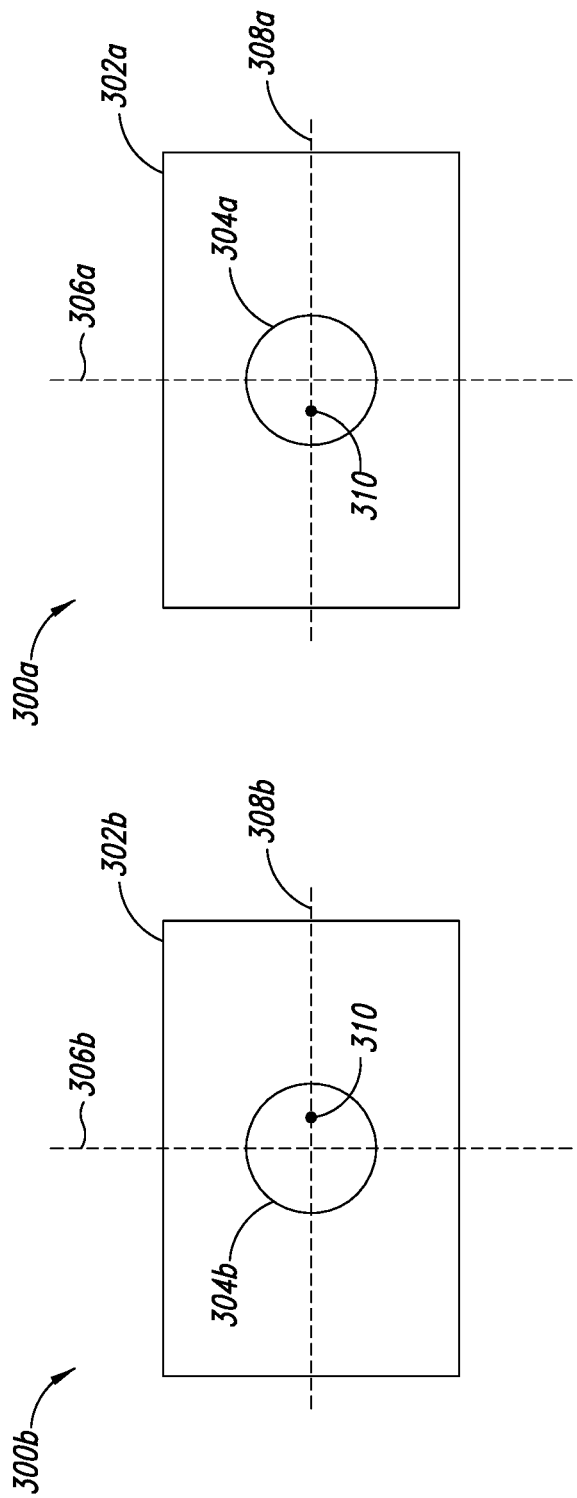
FIG. 4A is a top plan view of a sensor and lens for a conventional right side camera, with the lens centered over the sensor, in particular manners in particular embodiments in accordance with the described techniques of the present disclosure.
FIG. 4B is a top plan view of a sensor and lens for a conventional left side camera, with the lens centered over the sensor, in particular manners in particular embodiments in accordance with the described techniques of the present disclosure.

FIGS. 4A and 4B illustrate a front view of a sensor array 302a and lens 204a for a left camera 300a (FIG. 4B), and a sensor array 302b and a lens 304b for a right camera 300b (FIG. 4A). The horizontal centers of the sensor arrays 302a and 302b are indicated by the dashed lines 306a and 306b, respectively, and the vertical centers of the sensor arrays are indicated by the dashed lines 308a and 308b, respectively. In this example that shows a conventional configuration, the lens 304a is positioned directly over the center of the sensor array 302a, and the lens 304b is positioned directly over the center of the sensor array 302b. Since the two cameras 300a and 300b are skewed outward, as discussed above and shown in FIG. 3, a scene center or principal point 310 for both of the cameras 300a and 300b is offset inward toward each other by a certain amount, as indicated in FIGS. 4A and 4B. In particular, for the left camera 300a, the center 310 is positioned inward (to the left as shown) of the horizontal center 306a of the sensor array 302a. Similarly, for the right camera 300b, the center 310 is positioned inward (to the right as shown) of the horizontal center 306b of the sensory array 302b. In conventional systems, in order to center the cameras 300a and 300b, the software of the head-mounted display system finds the center points 310 and utilizes a substantial amount memory to shift the image over to correct the distortion over the FOV. The centering undesirably costs memory that could otherwise be used to undistort the image. That is, the software shifts (or translates) pixels over to determine a new center, to use for distortion correction.

As an example, an image signal processor of a head-mounted display system may be able to store 60 or 70 pixels (columns of pixels), so an image may be offset by up to that number of pixels. Due to the cameras being tilted outward, approximately 30 pixels may be stored during read out before the actual data is used for correlation, because the pixels the images start correlating after 30 pixels have been read out because that is where the center is between the two cameras.

Figure 5:
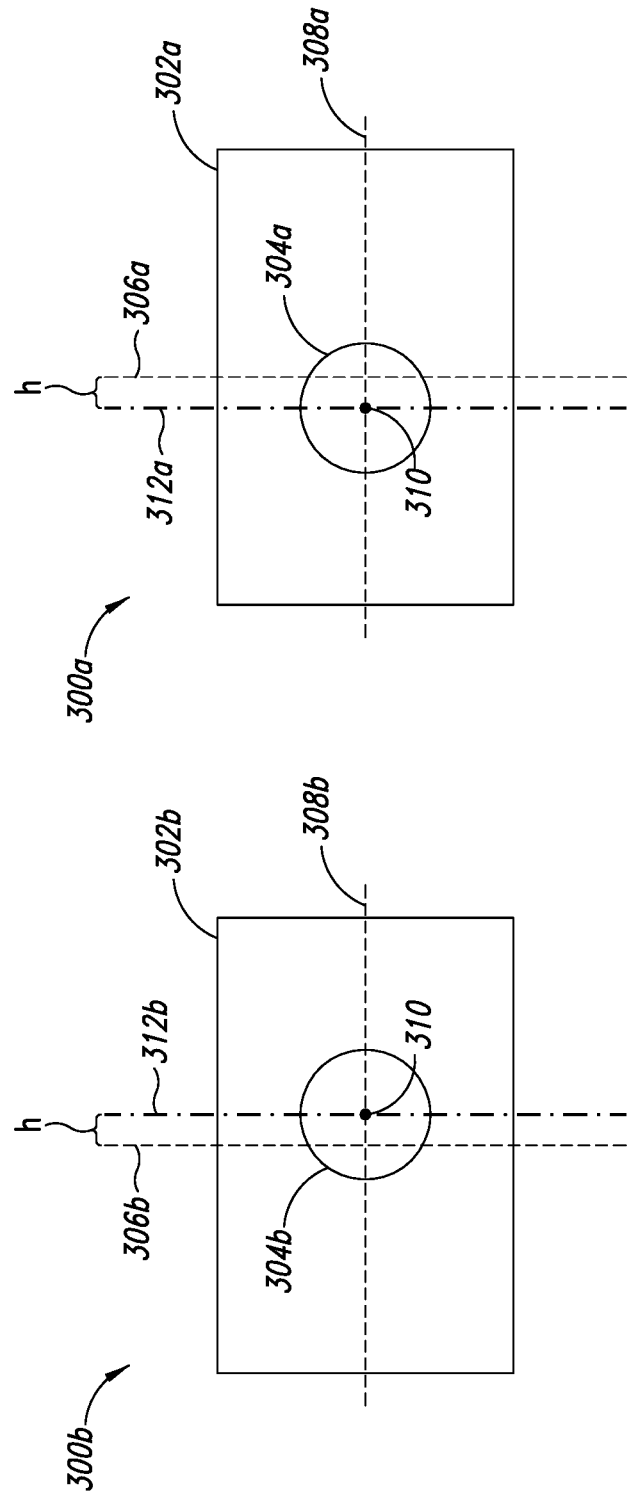
FIG. 5A is a top plan view of a sensor and lens for a right side camera, with the lens laterally offset inward relative to the center of the sensor, in particular manners in particular embodiments in accordance with the described techniques of the present disclosure.
FIG. 5B is a top plan view of a sensor and lens for a left side camera, with the lens laterally offset inward relative to the center of the sensor, in particular manners in particular embodiments in accordance with the described techniques of the present disclosure.
Figure 6:
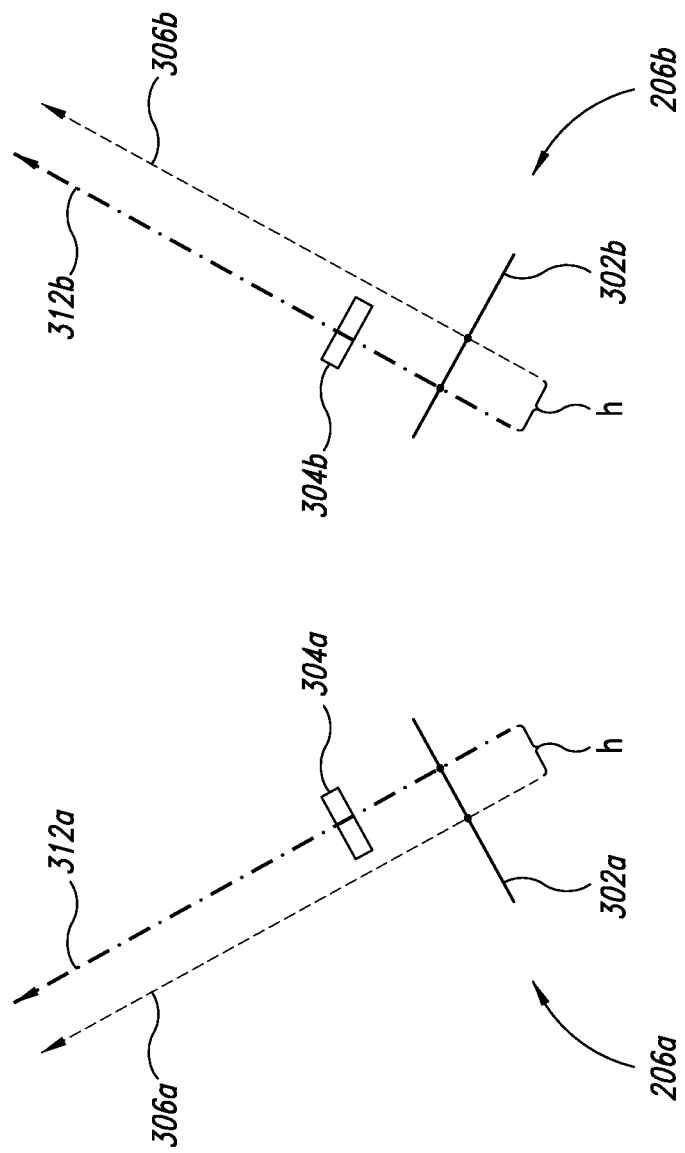
FIG. 6 is a top plan view of respective sensors and lens assemblies of the two cameras shown in FIGS. 5A and 5B, in particular manners in particular embodiments in accordance with the described techniques of the present disclosure.

FIGS. 5A, 5B, and 6 illustrate an exemplary implementation of the left camera 300a (FIGS. 5B and 6) and the right camera 300b (FIGS. 5A and 6). In this implementation, as shown in FIGS. 5B and 6, the left camera lens 304a and its corresponding optical axis 312a are laterally offset by a distance "h" from the horizontal center 306a of the left camera sensor array 302a toward a center of the head-mounted display system to center the left camera lens substantially on the scene center or principal point 310. Similarly, as shown in FIGS. 5A and 6, the right camera lens 304b and its corresponding optical axis 312b are laterally offset by a distance "h" from the horizontal center 306b of the left camera sensor array 302b toward the center of the head-mounted display system to center the right camera lens substantially on the scene center or principal point 310. In at least some implementations, the lateral offset distance "h" may be the same for the left camera lens 304a and the right camera lens 304b.

Thus, rather than using memory for pixel offset, as with the camera configuration shown in FIGS. 4A and 4B, by offsetting the lenses 304a and 304b inwardly with respect to the sensory arrays 302a and 302b, respectively, distortion is now centered about the scene center 310. Accordingly, correlation windows for images produced by the cameras 300a and 300b match well because both images are centered on the scene center 310.

Figure 7:
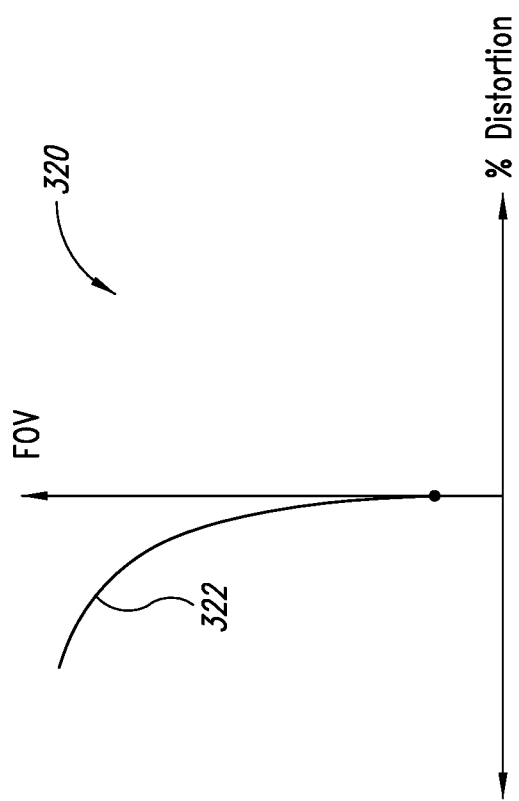
FIG. 7 is a graph that includes a plot of percent distortion as a function of field of view for lens assemblies and sensors of the conventional cameras shown in FIGS. 4A and 4B, in FIG. 8 is a graph that includes a plot of percent distortion as a function of field of view for lens assemblies and sensors of the cameras shown in FIGS. 5A and 5B, in particular manners in particular embodiments in accordance with the described techniques of the present disclosure.

FIG. 7 is a graph 320 that includes a plot 322 of percent distortion as a function of field of view for conventional lens assemblies and sensors shown in FIGS. 4A and 4B. As shown, the distortion is offset with respect to the field of view due to the outward tilt of the cameras 300a and 300b.

Figure 8:
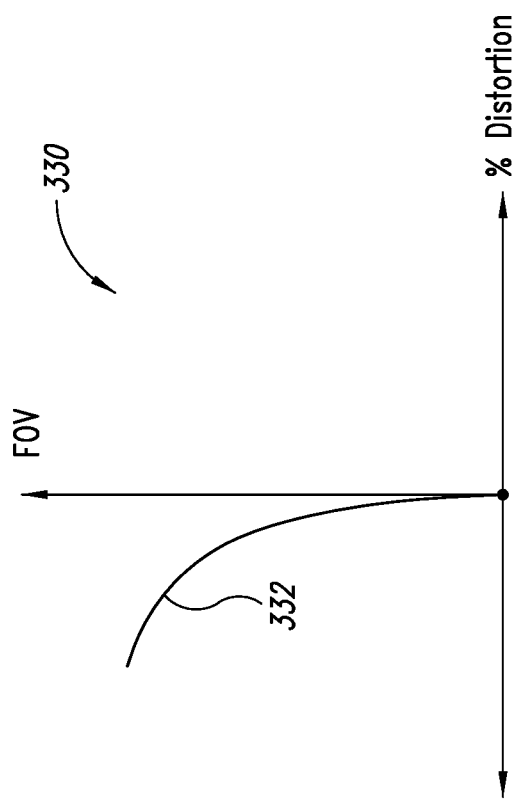

FIG. 8 is a graph 330 that includes a plot 332 of percent distortion as a function of field of view for lens assemblies and sensors shown in FIGS. 5A, 5B, and 6. As shown, the distortion is centered about the scene center (i.e., minimal distortion at the center of the FOV) due to the lenses 304a and 304b being laterally offset inward with respect to the centers of the sensor arrays 302a and 302b, respectively, as discussed above.

Figure 9:
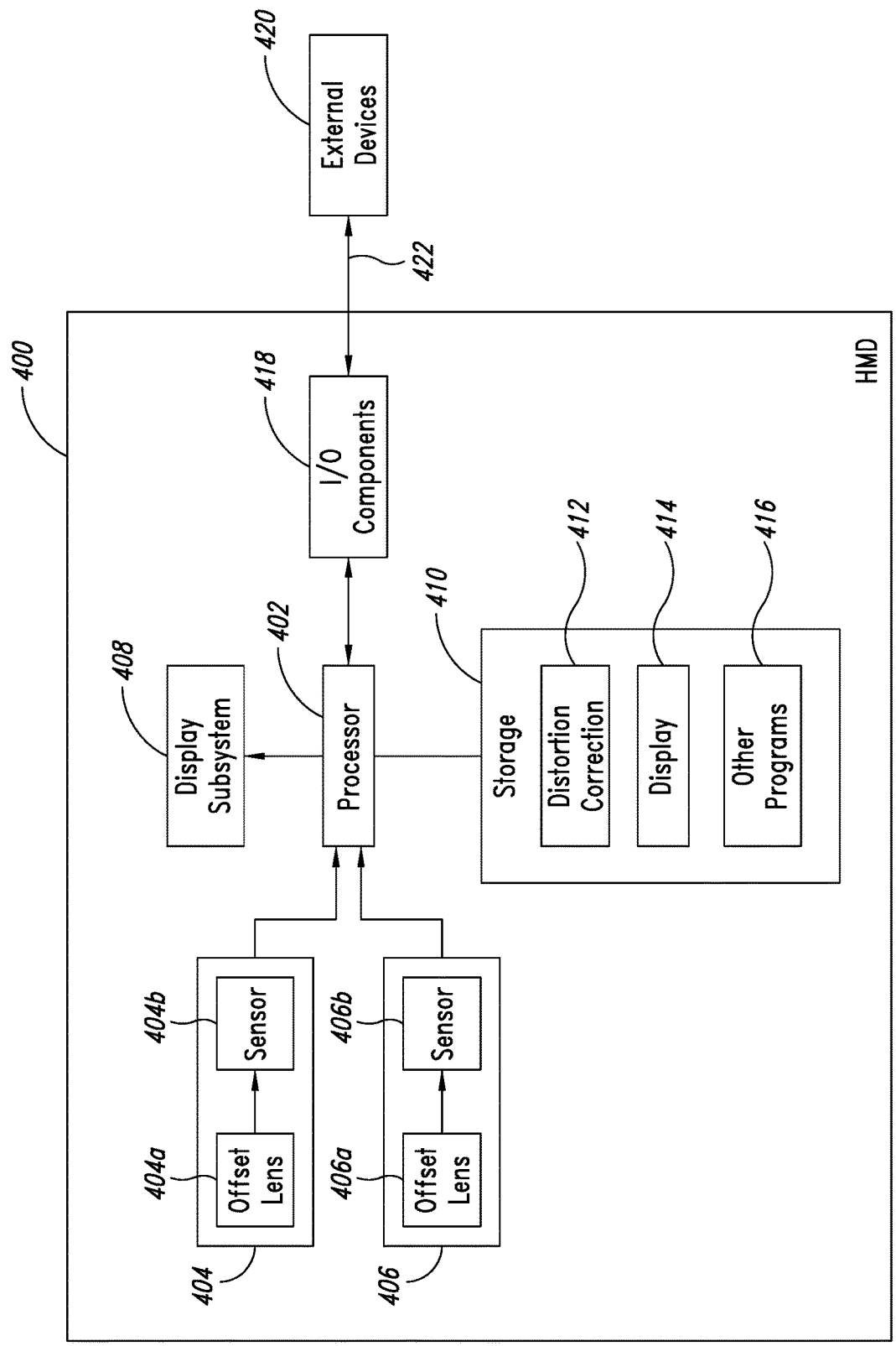
FIG. 9 is a schematic block diagram for an example head-mounted display system, in particular manners in particular embodiments in accordance with the described techniques of the present disclosure.

FIG. 9 shows a schematic block diagram of an HMD system 400 according to one or more implementations of the present disclosure. The HMD system 400 may be similar or identical to the HMD systems 100 and 200 discussed above. Thus, the discussion above with regard to the HMD systems 100 and 200 may also apply to the HMD system 400.

The HMD system 400 includes a processor 402, a first camera 404 (e.g., left camera) and a second camera 406 (e.g., right camera), which cameras are components of a stereo depth camera. The first camera 404 may include a sensor array 404b and a lens 404a laterally offset from a center of the sensor array, as discussed above with reference to FIGS. 5A-5B and 6. The second camera 406 may include a sensor array 406b and a lens 406a laterally offset from a center of the sensor array, as discussed above.

The HMD system 400 may include a display subsystem 408 (e.g., two displays and corresponding optical systems). The HMD system 400 may also include a nontransitory data storage 410 that may store instructions or data for distortion correction 412, position tracking, instructions or data for display functionality 414 (e.g., games), and/or other programs 416.

The HMD system 400 may also include various I/O components 418, which may include one or more user interfaces (e.g., buttons, touch pads, speakers), one or more wired or wireless communications interfaces, etc. As an example, the I/O components 418 may include a communications interface that allows the HMD system 400 to communicate with an external device 420 over a wired or wireless communications link 422. As non-limiting examples, the external device 420 may include a host computer, a server, a mobile device (e.g., smartphone, wearable computer), etc. The various components of the HMD system 400 may be housed in a single housing (e.g., support structure 204 of FIGS. 2 and 3), may be housed in a separate housing (e.g., host computer), or any combinations thereof.

It will be appreciated that the illustrated computing systems and devices are merely illustrative and are not intended to limit the scope of the present disclosure. For example, HMD 400 and/or external devices 420 may be connected to other devices that are not illustrated, including through one or more networks such as the Internet or via the Web. More generally, such a computing system or device may comprise any combination of hardware that can interact and perform the described types of functionality, such as when programmed or otherwise configured with appropriate software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated systems 400 and 420 may include executable software instructions and/or data structures in at least some embodiments, which when loaded on and/or executed by particular computing systems or devices, may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated systems are software-based systems including software instructions that, when executed by the processor(s) and/or other processor means, program the processor(s) to automatically perform the described operations for that system. Furthermore, in some embodiments, some or all of the systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Those of skill in the art will recognize that many of the methods or algorithms set out herein may employ additional acts, may omit some acts, and/or may execute acts in a different order than specified.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A head-mounted display system, comprising:
a support structure; and
a stereo depth camera carried by the support structure, the stereo depth camera operative to capture stereo images, the stereo depth camera comprising:
a left camera skewed outward by a non-zero angle from a forward direction of the head-mounted display system, the left camera comprising a left camera sensor array and a left camera lens positioned forward of the left camera sensor array, the left camera lens comprising an optical axis that is laterally offset from the center of the left camera sensor array toward a center of the support structure to center the left camera lens substantially on a principal point; and
a right camera horizontally spaced apart from the left camera and skewed outward by a non-zero angle from the forward direction of the head-mounted display system, the right camera comprising a right camera sensor array and a right camera lens positioned forward of the right camera sensor array, the right camera lens comprising an optical axis that is laterally offset from the center of the right camera sensor array toward the center of the support structure to center the right camera lens substantially on the principal point.

2. The head-mounted display system of claim 1 wherein each of the left camera lens and the right camera lens comprises a fisheye lens.

3. The head-mounted display system of claim 1 wherein the optical axis of the left camera lens is laterally offset from the center of the left camera sensor array by a left offset distance and the optical axis of the right camera lens is laterally offset from the center of the right camera sensor array by a right offset distance, wherein the left offset distance is equal to the right offset distance.

4. The head-mounted display system of claim 1 wherein the left camera and right camera are each skewed outward by a non-zero angle that is between 5 degrees and 10 degrees from the forward direction.

5. The head-mounted display system of claim 1 wherein the respective lateral offsets of the left and right camera lenses provide a horizontal disparity between corresponding points of images captured by the left and right cameras that is less than 5 pixels.

6. The head-mounted display system of claim 1 wherein the left and right camera lenses are laterally offset such that the distortion of the camera lenses is centered about a scene center that is in the forward direction of the head-mounted display system.

7. A stereo depth camera operative to capture stereo images, the stereo depth camera comprising:
 a left camera skewed outward by a non-zero angle from a forward direction of a head-mounted display system, the left camera comprising a left camera sensor array and a left camera lens positioned forward of the left camera sensor array, the left camera lens comprising an optical axis that is laterally offset from the center of the left camera sensor array toward a center of the head-mounted display system to center the left camera lens substantially on a principal point; and
 a right camera horizontally spaced apart from the left camera and skewed outward by a non-zero angle from the forward direction of the head-mounted display system, the right camera comprising a right camera sensor array and a right camera lens positioned forward of the right camera sensor array, the right camera lens comprising an optical axis that is laterally offset from the center of the right camera sensor array toward the center of the head-mounted display system to center the right camera lens substantially on the principal point.

8. The stereo depth camera of claim 7 wherein each of the left camera lens and the right camera lens comprises a fisheye lens.

9. The stereo depth camera of claim 7 wherein the optical axis of the left camera lens is laterally offset from the center of the left camera sensor array by a left offset distance and the optical axis of the right camera lens is laterally offset from the center of the right camera sensor array by a right offset distance, wherein the left offset distance is equal to the right offset distance.

10. The stereo depth camera of claim 7 wherein the left camera and right camera are each skewed outward by a non-zero angle that is between 5 degrees and 10 degrees from the forward direction.

11. The stereo depth camera of claim 7 wherein the respective lateral offsets of the left and right camera lenses provide a horizontal disparity between corresponding points of images captured by the left and right cameras that is less than 5 pixels.

12. The stereo depth camera of claim 7 wherein the left and right camera lenses are laterally offset such that the distortion of the camera lenses is centered about a scene center that is in the forward direction of the head-mounted display system.

13. A method of providing a stereo depth camera operative to capture stereo images, the method comprising:
 coupling a left camera to a support structure of a head-mounted display system, the left camera skewed outward by a non-zero angle from a forward direction of the head-mounted display system, wherein the left camera comprises a left camera sensor array and a left camera lens positioned forward of the left camera sensor array, the left camera lens comprising an optical axis that is laterally offset from the center of the left camera sensor array toward a center of the support structure to center the left camera lens substantially on a principal point; and
 coupling a right camera to the support structure of the head-mounted display system, the right camera skewed outward by a non-zero angle from the forward direction of the head-mounted display system, the right camera comprises a right camera sensor array and a right camera lens positioned forward of the right camera sensor array, the right camera lens comprising an optical axis that is laterally offset from the center of the right camera sensor array toward the center of the support structure to center the right camera lens substantially on the principal point.

14. The method of claim 13 wherein coupling a left and right camera to a support structure of a head-mounted display system comprises coupling a left and right camera to a support structure of a head mounted display system, and each of the left camera lens and the right camera lens comprises a fisheye lens.

15. The method of claim 13 wherein coupling a left and right camera to a support structure of a head-mounted display system comprises coupling a left and right camera to a support structure of a head mounted display system, and the optical axis of the left camera lens is laterally offset from the center of the left camera sensor array by a left offset distance and the optical axis of the right camera lens is laterally offset from the center of the right camera sensor array by a right offset distance, wherein the left offset distance is equal to the right offset distance.

16. The method of claim 13 wherein coupling a left and right camera to a support structure of a head-mounted display system comprises coupling a left and right camera to a support structure of a head mounted display system, and the left camera and right camera are each skewed outward by a non-zero angle that is between 5 degrees and 10 degrees from the forward direction.

\* \* \* \* \*